Dec. 27, 1955   H. J. BUTLER   2,728,421
AIR-COOLED BRAKE DISK
Filed Oct. 11, 1949   3 Sheets-Sheet 2
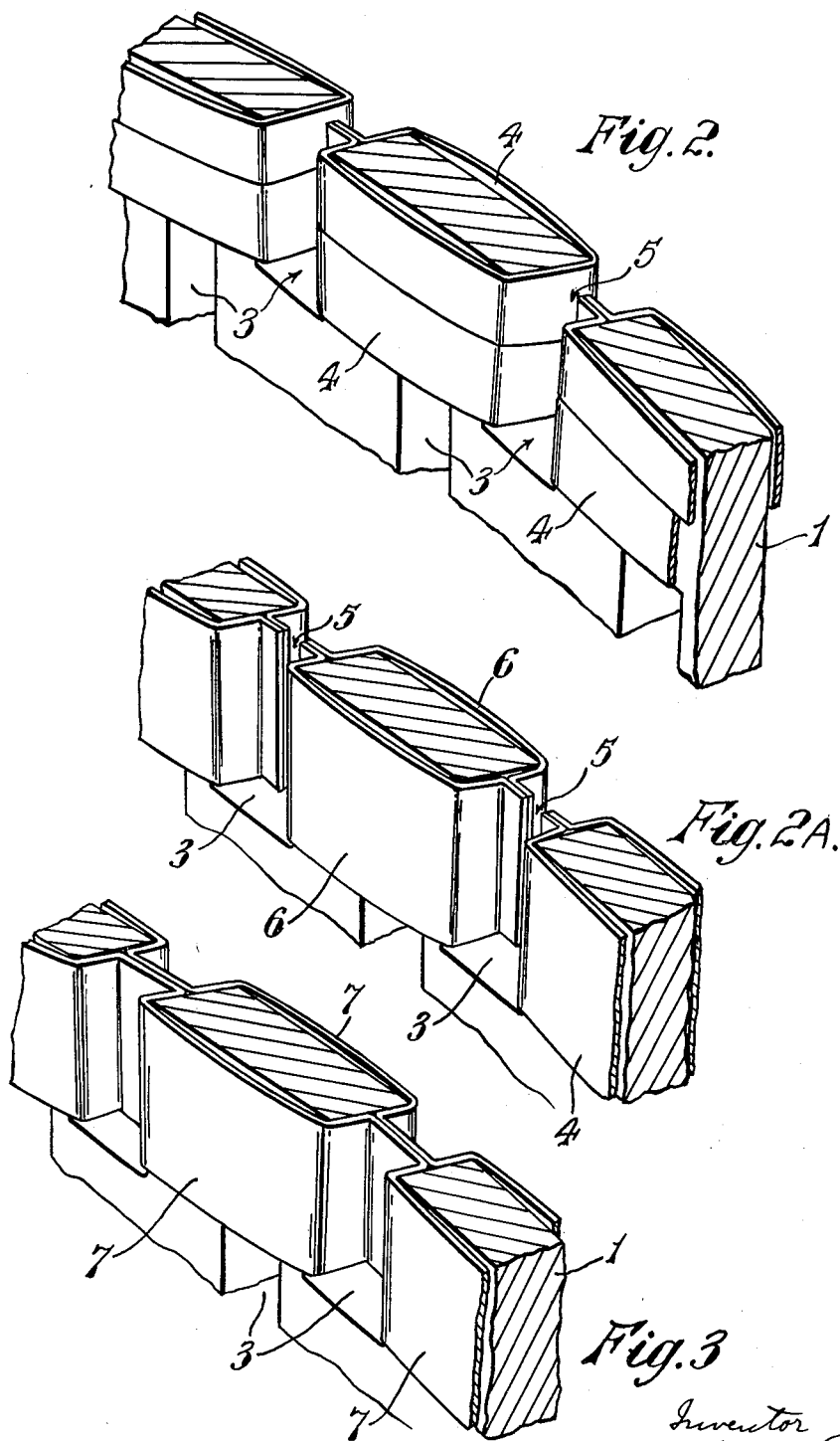

Dec. 27, 1955   H. J. BUTLER   2,728,421
AIR-COOLED BRAKE DISK
Filed Oct. 11, 1949   3 Sheets-Sheet 3

INVENTOR
Henry James Butler
by Benj. T. Rauber
his attorney

United States Patent Office 2,728,421
Patented Dec. 27, 1955

2,728,421

AIR-COOLED BRAKE DISK

Henry James Butler, Sutton Coldfield, England, assignor to Dunlop Rubber Company Limited, London, England, a British company Application October 11, 1949, Serial No. 120,639

Claims priority, application Great Britain October 15, 1948

6 Claims. (Cl. 188—218)

This invention relates to disc brakes for vehicles and more particularly to brake discs for aircraft disc brakes.

When a vehicle is brought to a standstill by means of its brakes its kinetic energy is converted into heat in the brakes assembly. In the case of an aeroplane of considerable weight and high landing speed, a great amount of heat is developed in the short space of time required to land the aircraft. Unless this heat is rapidly dissipated, the temperature rise in the brakes may be sufficient to cause charring of the friction faces of the brake pads, and, where disc brakes are employed, to distort the discs, thus rendering the brakes inefficient or even inoperative. Moreover, the brake discs currently used in aircraft disc brakes are of considerable weight, and it would be advantageous to reduce this weight, so that the pay-load of the aircraft may be increased.

It is the object of this invention to provide a brake disc which is lighter in weight than known discs, which is not so liable to distort when subjected to the high temperature produced during aircraft braking and which will allow heat to dissipate more rapidly.

According to the invention a brake disc comprises a backing plate adapted to rotate with an associated wheel and a friction element interwound thereon and rotatable therewith.

The backing plate of the present invention may be very thin, compared with the thickness of known discs, and may be of the order of ⅛" thick. Since the plate itself is at no time in frictional engagement with the friction pads of the brake it may be made of a light metal alloy, of bonded fabric or plastic. The friction element preferably has a thickness of the order of 0.005 inch and is made of a metallic strip having a high thermal conductivity as well as good wearing qualities, e. g. beryllium-copper, nickel-chrome or tungsten, and preferably also the element is given a slight springiness, for reasons which will be described later. Alternatively the friction elements are made of planished wire gauze or expanded metal.

In order that the invention may be more fully described, reference is made to the accompanying drawings, in which:

Fig. 2 is a perspective view of part of Fig. 1 showing the construction in more detail.

Figs. 2A and 3 are alternatives to the construction shown in Fig. 2.

Figure 1:
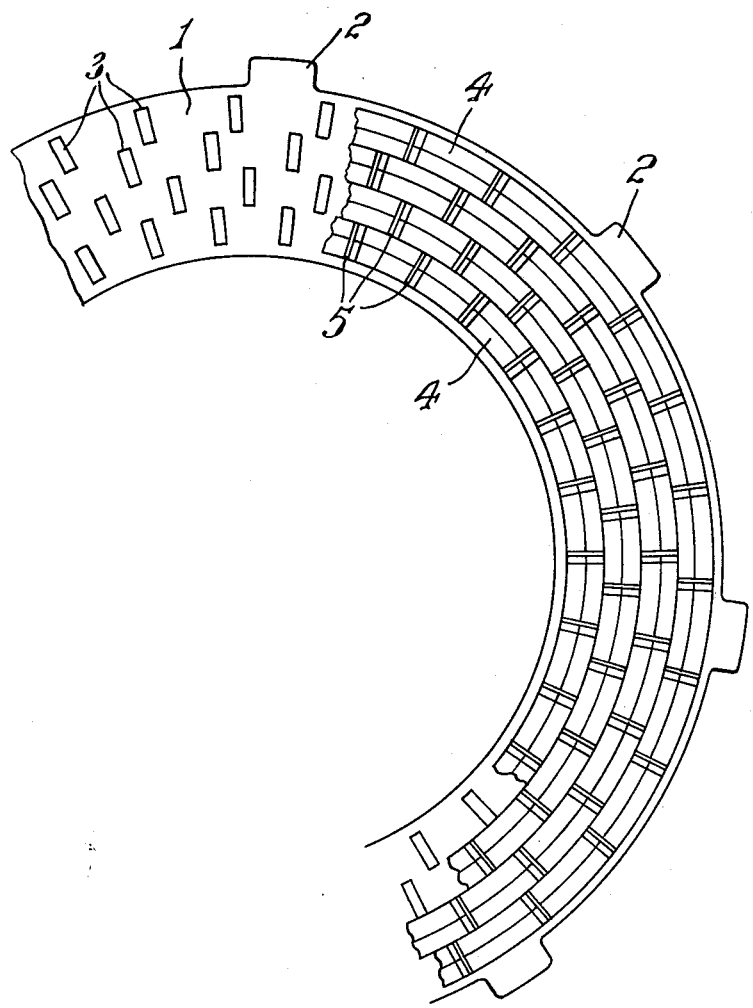
Fig. 1 is a part plan view of a disc constructed in accordance with one embodiment of the invention.

In one embodiment of the invention, Figs. 1 and 2, the brake disc comprises an annular metal backing plate 1, provided with dogs 2, equispaced around its outer periphery and adapted to engage in complementary slots in an associated wheel, whereby the plate is rotatable with the wheel. The plate is provided with a plurality of slots 3 of rectangular section which extend axially through the thickness of the backing plate. Four circular rows of slots are provided, the slots of each row being equispaced, and the slots of one row are staggered with respect to the slots of adjacent rows.

A friction element 4 of beryllium-copper, having a thickness of approximately 0.005 inch, is wound round each substantially sector-shaped web of the backing plate between adjacent slots on the same circle. The ends of each element are turned at right angles and are butted together and secured in this position e. g. by welding. This construction is shown in Fig. 2, where a portion of the disc has been omitted to show the friction element in greater detail. The elements may be slit along their major axis to allow of increased ventilation as illustrated in Figs. 1 and 2, and an air space 5 is provided between adjacent circumferentially aligned friction elements. Fig. 2A illustrates friction elements 6 made in two pieces, the end of each piece being turned outwardly into the slot, butted against the corresponding end of the other and secured in this position by welding or the like. The springiness of the element ensures that it stands proud of the face of the backing plate, thus allowing air to pass between it and said plate to provide additional cooling.

In another embodiment of this particular construction the friction elements associated with each circular row of slots are continuous, and this is illustrated in perspective in Fig. 3. Eight annular elements 7 are provided, two to co-operate with each row of slots and four on each side of the backing plate. The two elements associated with each row of slots are secured together through the slots, thus producing a disc similar to that illustrated in Fig. 2A, except that the air-gap is not provided.

Figure 4:
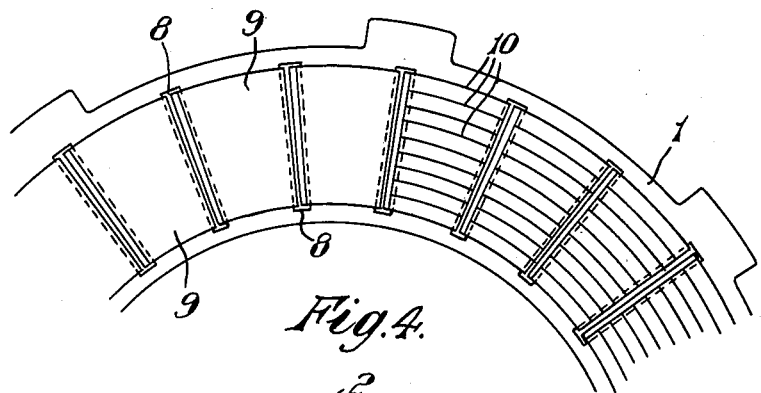
Figs. 4 and 5 are part plan views of two other embodiments of the invention.
Figure 6:
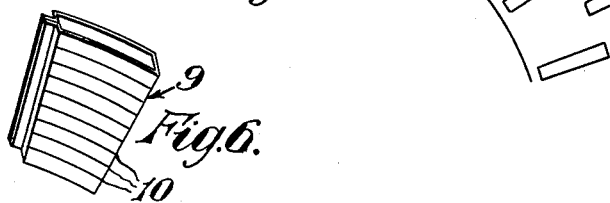
Fig. 6 is a perspective sketch of a facing element of Fig. 4, showing said element in greater detail.

In Fig. 4 a portion of a disc is illustrated, the backing plate having radially aligned and equispaced slots 8 extending from a location adjacent the inner periphery to a location adjacent the outer-periphery. Sector-shaped friction elements 9 are fitted round the webs of the backing plate between adjacent slots, and the ends of the friction elements are butted together and welded within the slot as described in the first embodiment of the invention. The friction elements may be provided with circumferentially-extending slits 10 on their radial faces to increase ventilation. The elements may conveniently be preformed to assist assembly to the backing plate, such an element being illustrated in Fig. 6.

Figure 5:
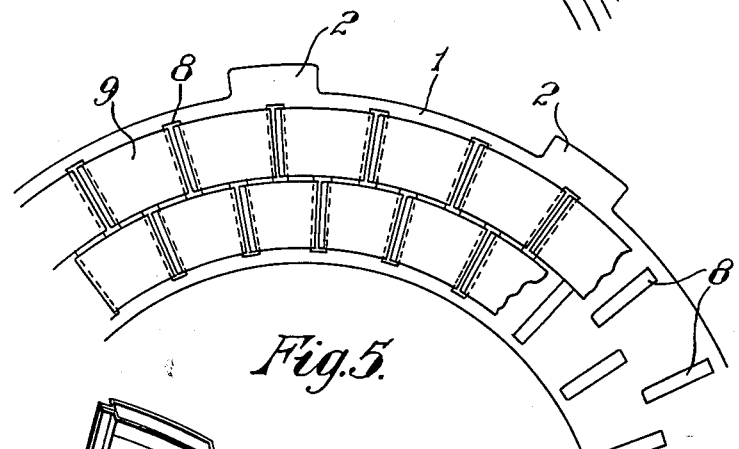

A similar construction is shown in Fig. 5 where two rows of slots are provided, the slots of one row being staggered with respect to the slots of the adjacent row. Friction elements are provided as in the previous construction.

Figure 7:
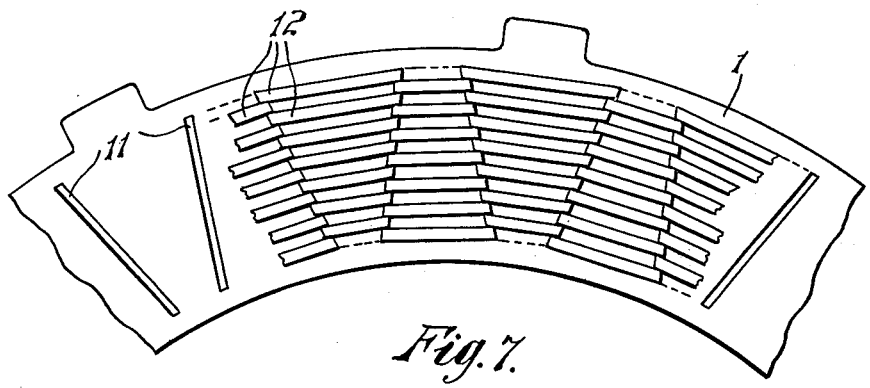
Fig. 7 is a part plan view of another embodiment of the invention.

In another embodiment of the invention, Fig. 7, the backing plate is provided with a plurality of pairs of slots 11 extending from a location adjacent the inner periphery of the plate to a location adjacent the outer periphery. The slots are disposed at an angle to the radius, each pair of adjacent slots sloping away from one another. A plurality of strips of beryllium-copper 12 are laced in and out of the slots between adjacent webs of the backing plate, the ends of each strip being secured together in one of the slots. The strips are so arranged that, taking one web between adjacent slots, each circular metal strip passes alternately in front of and behind said web, and adjacent strips are pressed firmly one against the other in side by side relationship. Preferably each springy strip stands slightly proud of the face of the disc at each turn of its interlacing. Instead of a plurality of strips concentrically threaded through the plate a single strip may be spirally threaded therethrough. In this case the slots are radially extending, and an odd number are provided so that the metal strip may be evenly distributed over the entire face of both sides of the disc.

The brake disc constructed according to this invention is preferably used in a "spot type" brake, i. e. a brake wherein an axially-aligned pair of friction pads is adapted to frictionally engage the disc. Preferably also, the associated wheel is provided with means for deflecting a substantial blast of air on to the brake. As the brake is applied the friction pads frictionally engage the friction elements, forcing them against the backing plate and thus decelerating the wheel in the normal manner. The elements are heated by said frictional engagement, but on coming out of engagement with the pads, spring away from the surface of the backing plate. Air can thus pass on both sides of the element and substantially cool it before it is again heated by frictional engagement. The elements being very thin, they heat up and also cool down very rapidly. The brake disc is also suitable for use in brakes having one or more sets of axially-aligned friction pads.

The backing plate itself is only heated by conduction from the elements and distortion of the disc by excessive heat is hereby reduced.

The construction of the plate also allows a certain amount of air to pass through it, and so accelerates the cooling process, whilst the thinness of the plate allows the contained heat to be dissipated more quickly.

The backing plate may be made of steel and the driving dogs may be provided on the inner periphery of the backing plate, instead of the outer periphery, as described and illustrated.

Having described my invention what I claim is:

1. A brake disc comprising a backing plate adapted to rotate with an associated wheel and provided with a plurality of slots and a plurality of bare, metallic, springy, friction elements, each element being wound through two adjacent slots and spaced away from the face of the backing plate between said slots to provide an air gap and having its free ends secured together within one of said slots and rotatable with the backing plate.

2. The brake disc of claim 1, in which said slots are elongated radially.

3. The brake disc of claim 1, in which the slots are arranged in at least two concentric series, the slots of one series being staggered with relation to those of an adjacent series.

4. The brake disc of claim 1 in which the holes are elongated slots extending in directions inclined alternately in opposite directions to a radial direction.

5. The brake disc of claim 1 in which said springy, metallic friction elements are individual strips of metal encircling the space between a pair of successive slots and are secured in said slots to leave an air space through said holes.

6. The brake disc of claim 1 in which said springy friction elements comprise a continuous strip of metal threaded through said openings alternately from one side to the other in a spiral about said center of rotation of said backing plate.

References Cited in the file of this patent

UNITED STATES PATENTS

| | | |
|---|---|---|
| 1,493,433 | Guay et al. | May 6, 1924 |
| 1,613,669 | Maynard | Jan. 11, 1927 |
| 1,700,493 | Guay | Jan. 29, 1929 |
| 2,234,765 | Joyce | Mar. 11, 1941 |
| 2,396,153 | Butler | Mar. 5, 1946 |
| 2,656,021 | Butler | Oct. 20, 1953 |

FOREIGN PATENTS

| | | |
|---|---|---|
| 594,921 | Great Britain | Nov. 21, 1947 |